3,112,317
PREPARATION OF PIPERAZINE AND PIPERAZINE HYDRATE
Franz Marschall, deceased, late of Easton, Pa., by Irmgard D. Marschall, administratrix, Easton, Pa., and Raymond L. Mayhew, Summit, N.J., assignors to General Aniline & Film Corporation, New York, N.Y., a corporation of Delaware
No Drawing. Filed Jan. 27, 1961, Ser. No. 85,435
12 Claims. (Cl. 260—268)

This invention relates to the preparation of piperazine and relates more particularly to a novel process for the preparation of piperazine hydrate.

The cyclization of piperazine is known in the prior art where it is accomplished by carrying the vapor of aminoethylethanolamine over a catalyst at higher temperatures or by carrying out the reaction in the presence of catalyst at high pressures in the presence or absence of a dilutent.

Various catalysts have been employed by workers of the prior art to accomplish this cyclization. Among them are the free metals of groups III and VIII of the periodic system, except mercury, the use of which produce good yields of product but have the disadvantage of being expensive. Activated alumina is known to catalyze the reaction at temperatures in the range of 350–550° C., but the yields of product are very low. Copper-containing catalysts are very efficient provided that a temperature of 175–220° C. and a pressure of 1000–2000 p.s.i. are maintained throughout the reaction.

An important object of this invention is to provide a cheap, simple and efficient process for preparing piperazine or piperazine hydrate by cyclizing aminoethylethanolamine in the presence of a phosphorus-containing catalyst.

Another object of this invention is the provision of a process for the preparation of piperazine hydrate by cyclizing aminoethylethanolamine at substantially atmospheric pressure and at its boiling point in the presence of a phosphorus-containing compound.

Still another object of this invention is the provision of a process for the preparation of piperazine hydrate by heating aminoethylethanolamine in the presence of a triaryl phosphate, phosphorus oxychloride, phosphoric acid, a metaphosphate of any metal of groups I, II, III and VIII of the periodic system, or mixtures of these.

A further object of the invention is to provide a process for the preparation of piperazine hydrate by distilling aminoethylethanolamine in the presence of a suitable phosphorus-containing compound.

Another object of this invention is the provision of a process for the preparation of piperazine hydrate by passing vaporized aminoethylethanolamine over a heated bed of phosphorus-containing catalyst.

A further object is the provision of a process for the preparation of piperazine hydrate by dropping aminoethylethanolamine containing a minor amount of a phosphorus-containing compound, such as phosphorus oxychloride, into a heated tube.

Other objects of this invention will appear from the following detailed description.

The foregoing objects of this invention may best be attained by heating aminoethylethanolamine to at least its boiling point in the presence of one or more phosphorus compounds selected from the class of metallic metaphosphates, particularly those of groups I, II, III and VIII of the periodic system, phosphorus oxychloride, phosphoric acid and the triorgano phosphates, particularly triaryl phosphates, and condensing the product.

The condensation reaction according to this invention proceeds as follows:

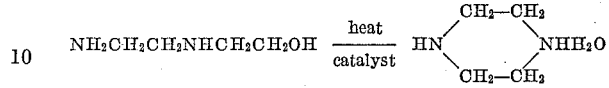

Preferably, the reaction is carried out at the boiling point of aminoethylethanolamine, although higher temperatures are operable. Either liquid or vapor phase operation is within the scope of the invention.

The preferred embodiment comprises distilling aminoethylethanolamine, to which catalyst has been added, through a fractionating column at a pressure of 700–760 millimeters of mercury and collecting the distillate, which is almost entirely pure piperazine hydrate. This product may be processed to obtain piperazine itself if desired; in many instances it may be used directly in the hydrate form. This embodiment possesses the advantage of being both simple and economical.

Numerous other embodiments are within the scope of this invention. Among them is the method comprising conducting aminoethylethanolamine in the vapor phase over a heated catalyst bed comprising a suitable phosphorus compound precipitated on an inert carrier. Any of the known inert carriers may be used, including, for example, pumice, silica, diatomaceous earth, alumina, zirconia, absorbent clays, titania, etc. The effluent vapors are collected and condensed, and must then be fractionated in order to obtain a piperazine hydrate product of sufficient purity to be useful without further processing. This embodiment requires very little time to complete the reaction and is suitable for large-scale manufacture of piperazine hydrate; however, it does not produce as high yields of product as the previously described embodiment and it requires both a preheating and a fractionating step besides the condensation step itself.

A third embodiment comprises dropping aminoethylethanolamine to which a small amount of catalyst has been added through a tube heated to a temperature high enough to cause vaporization of the feed material on contact with the tube, i.e., above 243° C., the boiling point of aminoethylethanolamine. The effluent vapors are condensed and must be fractionated in order to obtain a piperazine hydrate product of usable purity. This method produces high yields of product in a relatively short time, but requires a fractionating step in addition to the main one.

Other embodiments will be readily apparent to one skilled in the art.

The reaction is preferably effected at atmospheric pressure, though reduced pressures as low as 700 millimeters of mercury are sometimes employed. Higher or lower pressures are also operable but are not preferred because they increase the cost and impair the simplicity of the operation.

The amount of catalyst employed is conveniently in the range of 0.5 to 25%, although this is not critical.

Numerous phosporous compounds, both organic and inorganic, catalyze the reaction. The preferred ones are phosphoric acid, phosphorus oxychloride, the organic triarylphosphates, especially triphenyl and tricresyl phosphate, and the metallic metaphosphates of metals of groups I, II, III and VIII of the Periodic System, especially those of sodium, potassium, calcium, zinc, aluminum and nickel. The phosphorus compound catalysts are equally effective whether used singly or in admixture with one another.

If piperazine, rather than piperazine hydrate which is the initial condensation product, is desired, the pure condensed effluent may be admixed with benzene, dioxane, or any other solvent which azeotropes with water, and distilled azeotropically.

Having generally described the invention, the following examples are given by way of specific illustration:

*Example 1*

156 grams of aminoethylethanolamine were charged to a reaction vessel fitted with a fractionating column and 23.4 grams of sodium meta phosphate were added. After also adding some boiling chips, the mixture was heated to about 245° C., the boiling point of aminoethylethanolamine, whereupon the reaction began. The effluent vapors, comprising piperazine and water, were collected from the fractionating column. On cooling piperazine hydrate solidified. The reaction required almost 7 hours to reach completion. During its course the temperature in the reaction vessel was observed to rise slightly above 300° C. The yield of product, calculated as pure piperazine, was 41–42% based on aminoethylethanolamine feed.

*Example 2*

The procedure described in Example 1 was repeated, using as cataylst 23.4 grams of a 1.1 mixture of the metaphosphates of zinc and calcium. A good yield of piperazine hydrate was obtained.

*Example 3*

Example 1 was repeated, substituting 15.6 grams of tricresyl phosphate for sodium metaphosphate. The yield of piperazine hydrate, calculated as piperazine, was 40.8% based on the feed. When triphenyl phosphate was substituted for tricresyl phosphate, comparable results were obtained.

*Example 4*

156 grams of aminoethylethanolamine were charged to a suitable reaction vessel containing some boiling chips. 1.56 grams of phosphorus oxychloride were added and the mixture was heated to boiling, whereupon piperazine hydrade began to distill over. The reaction required about 6½ hours to reach completion. The product was collected as solid piperazine hydrate and admixed with 2–3 volumes of dioxane. After azetropically distilling this mixture, 53 grams of pure piperazine were recovered, a yield of 41% based on aminoethylethanolamine.

*Example 5*

To the catalyst residue from Example 4, 156 grams of aminoethylethanolamine were added and the mixture was treated as described in Example 4. 55.5 grams of piperazine were recovered, a yield of 43% based on the feed.

*Example 6*

The catalyst residue from Example 5 was admixed with 156 grams of fresh aminoethylethanolamine feed and the procedure of Example 4 was repeated. The yield of pure piperazine was 54 grams, or 42% by weight based on the feed.

*Example 7*

Example 4 was repeated, substituting 1.56 grams of phosphoric acid as catalyst for the cyclization reaction and using benzene as the azeotroping agent. Piperazine was recovered in 43% yield, by weight, based on the feed.

*Example 8*

312 grams of vaporized aminoethylethanolamine were passed rapidly through a heated reactor containing a heated catalyst bed consisting of pumice upon which was precipitated sodium, metaphosphate. The effluent vapors were collected and fractionally distilled. Approximately 40 grams of piperazine, a yield of about 24% by weight based on the feed, were recovered.

*Example 9*

156 grams of aminoethylethanolamine containing 1.56 grams of phosphorous oxychloride were passed into a reactor tube which had been preheated to 500° C. The mixture vaporized almost at once and after a few minutes the tube was rapidly cooled so as to condense its contents. After fractionation, 45 grams of pure piperazine were recovered (35% by weight based on the feed).

*Examples 10–17*

Using the procedure of Example 8, each of the following catalysts was employed: potassium metaphosphate on silica, calcium metaphosphate on alumina, zinc metaphosphate on pumice, aluminum metaphosphate on zirconia, nickel metaphosphate on pumice, iron metaphosphate-zinc metaphosphate on pumice, aluminum and nickel metaphosphates on pumice. The yields of piperazine ranged from 20–25% by weight based on the feed.

*Example 18*

Example 9 was repeated, substituting phosphoric acid for phosphorus oxychloride. 46 grams of piperazine were recovered, a yield of 36%.

It is to be understood that the foregoing detailed description is given by way of illustration and that many variations may be made therein without departing from the spirit of this invention.

What is claimed is:

1. In a method of preparing piperazine and piperazine hydrate, the steps which comprise heating aminoethylethanolamine to at least its boiling point in the presence of a catalyst comprising at least one phosphorous compound selected from the group consisting of the metaphosphates of the metals of groups I, II, III and VIII of the periodic system, phosphoric acid, phosphorus oxychloride, triphenyl phosphate, and tricresyl phosphate.

2. The method of claim 1 in which aminoethylethanolamine, to which catalyst has been added, is distilled through a fractionating column at an absolute pressure of 700 to 760 millimeters of mercury, and a distillate comprising piperazine hydrate is recovered.

3. The method of claim 1 in which vaporized aminoethylethanolamine is passed over a bed of catalyst precipitated on an inert carrier.

4. The method of claim 2 in which the piperazine hydrate product is admixed with an organic solvent which azeotropes with water, the mixture is azeotropically distilled, and pure piperazine is recovered.

5. The method of claim 1 in which the catalyst is sodium metaphosphate.

6. The method of claim 1 in which the catalyst is phosphorous oxychloride.

7. The method of claim 1 in which the catalyst is tricresyl phosphate.

8. The method of claim 1 in which the catalyst is phosphoric acid.

9. The method of claim 1 in which piperazine hydrate is recovered and the residue, which comprises catalyst, is reused to catalyze the cyclization of fresh aminoethylethanolamine to piperazine hydrate.

10. The method of claim 1 in which the catalyst is a mixture of zinc and calcium metaphosphates.

11. The method of claim 3 in which the catalyst is sodium metaphosphate on pumice.

12. A method of preparing piperazine hydrate which comprises heating aminoethylethanolamine to at least its boiling point in the presence of a catalyst comprising 0.5 to 25% of a phosphorus compound selected from the group consisting of the metaphosphates of the metals of groups I, II, III and VIII of the periods system, phosphoric acid, phosphorus oxychloride, triphenyl phosphate and tricresyl phosphate.

References Cited in the file of this patent

UNITED STATES PATENTS

| | | |
|---|---|---|
| 2,400,022 | Pollard et al. | May 7, 1946 |
| 2,525,223 | Howard | Oct. 10, 1950 |
| 2,875,206 | Levis et al. | Feb. 24, 1959 |

OTHER REFERENCES

Sabatier: Catalysis in Organic Chemistry, sec. 99, page 28, D. Van Nostrand Company, New York (1922).

Uhlig: Angewandte Chemie, vol. 66, pages 435–6 (1954).